United States Patent
Kamath et al.

(10) Patent No.: US 9,596,172 B2
(45) Date of Patent: Mar. 14, 2017

(54) MECHANISM FOR EXCHANGE OF ROUTING DATA BETWEEN CONTROLLERS

(71) Applicant: International Business Machines Corporation, Armonk, NY (US)

(72) Inventors: Dayavanti G. Kamath, Bangalore (IN); Vivek Murugesan, Bangalore (IN); Pon Murugesh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/316,943

(22) Filed: Jun. 27, 2014

(65) Prior Publication Data

US 2015/0381479 A1     Dec. 31, 2015

(51) Int. Cl.
| | |
|---|---|
| *H04L 12/721* | (2013.01) |
| *H04L 12/751* | (2013.01) |
| *H04L 12/851* | (2013.01) |
| *H04L 12/46* | (2006.01) |
| *H04W 28/02* | (2009.01) |

(52) U.S. Cl.
CPC .......... *H04L 45/38* (2013.01); *H04L 12/4633* (2013.01); *H04L 45/02* (2013.01); *H04L 47/2483* (2013.01); *H04W 28/0215* (2013.01)

(58) Field of Classification Search
CPC ....... H04L 45/38; H04L 45/58; H04L 45/025; H04L 47/35
USPC ........................................................ 370/254
See application file for complete search history.

(56) References Cited

U.S. PATENT DOCUMENTS

| | | | |
|---|---|---|---|
| 2013/0163427 A1* | 6/2013 | Beliveau | H04L 67/327 370/235 |
| 2013/0287026 A1 | 10/2013 | Davie | |
| 2013/0329601 A1* | 12/2013 | Yin | H04L 45/02 370/254 |
| 2015/0215202 A1* | 7/2015 | Sauer | H04L 45/38 370/256 |

(Continued)

FOREIGN PATENT DOCUMENTS

| | | |
|---|---|---|
| CN | 103166876 A | 6/2013 |
| WO | 2013082983 A1 | 6/2013 |

OTHER PUBLICATIONS

Balus et al., "Federated SDN-based Controllers for NVO3", Oct. 22, 2012, <http://tools.ietf.org/html/draft-sb-nvo3-sdn-federation-01>.

(Continued)

*Primary Examiner* — Jae Y Lee
*Assistant Examiner* — Jean F Voltaire
(74) *Attorney, Agent, or Firm* — David B. Woycechowsky; Olivia R. Scheuer

(57) ABSTRACT

Inter-tenant and inter-openflow island software communicate in SDN networks by: (i) providing a software defined networking (SDN) network including a plurality of Openflow islands, a first tenant and a second tenant; and (ii) communicating, from the first tenant over the SDN network to the second tenant, a first communication. The first communication passes through at least two Openflow islands of the plurality of Openflow islands as the first communication is communicated through the SDN network from the first tenant to the second tenant.

18 Claims, 5 Drawing Sheets

(56) References Cited

U.S. PATENT DOCUMENTS

2015/0358850 A1* 12/2015 La Roche, Jr. ... H04W 28/0215
370/328

OTHER PUBLICATIONS

Schmid et al., "Exploiting Locality in Distributed SDN Control", HotSDN'13, Aug. 16, 2013, Hong Kong, China, Copyright 2013 ACM 978-1-4503-2178—May 13, 2008.
"Integrating SDN Into the Data Center", Juniper Networks, White Paper, pp. 1-11, Oct. 2013, Copyright © 2013, Juniper Networks, Inc.

* cited by examiner

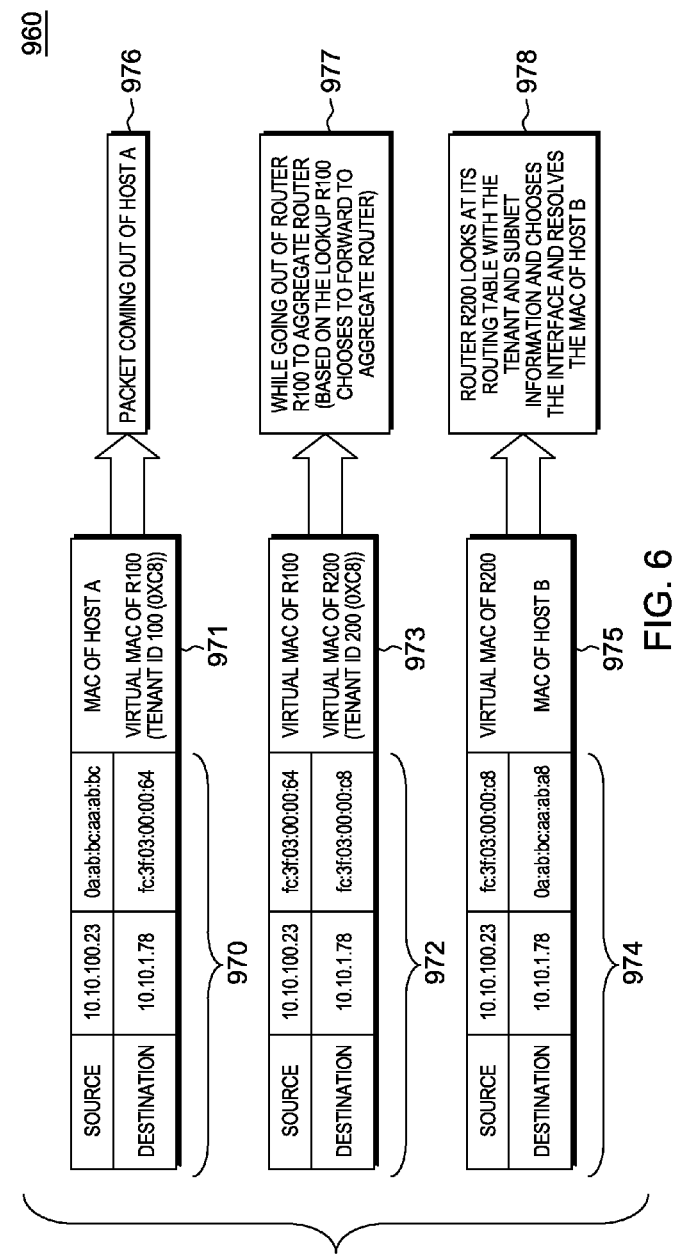

FIG. 7 — 950

| MATCH | IP | MAC | ACTION |
|---|---|---|---|
| Src | 10.10.100.23 | 0a:ab:bc:aa:ab:bc | Set_DL_Src - fc:3f:03:00:00:64 |
| Dst | 10.10.1.78 | fc:3f:03:00:00:64 | Set_DL_Dst - 0a:ab:bc:aa:ab:a8 |

FIG. 8 — 940

| MATCH | IP | MAC | ACTION |
|---|---|---|---|
| Src | 10.10.1.78 | 0a:ab:bc:aa:ab:a8 | Set_DL_Src - fc:3f:03:00:00:c8 |
| Dst | 10.10.100.23 | fc:3f:03:00:00:c8 | Set_DL_Dst - 0a:ab:bc:aa:ab:bc |

FIG. 9 — 930

| NETWORK | TENANT | CONTROLLER |
|---|---|---|
| 10.10.100.0/24 | 100 | LOCAL |
| 20.100.0.0/16 | 100 | LOCAL |
| 10.10.200.0/24 | 200 | LOCAL |
| 10.10.10.1/24 | 200 | LOCAL |
| 10.10.300.0/24 | 300 | LOCAL |
| 10.10.10.1/24 | 300 | LOCAL |
| 11.10.400.0/24 | 400 | C2 |
| 12.10.500.0/24 | 500 | C2 |
| 13.10.500.0/24 | 500 | C2 |
| 14.10.600.0/24 | 600 | C2 |

L3 AGGREGATE ROUTER
150.110.10.1

FIG. 10 — 920

| NETWORK | TENANT | CONTROLLER |
|---|---|---|
| 11.10.400.0/24 | 400 | LOCAL |
| 12.10.500.0/24 | 500 | LOCAL |
| 13.10.500.0/24 | 500 | LOCAL |
| 14.10.600.0/24 | 600 | LOCAL |
| 10.10.100.0/24 | 100 | C1 |
| 20.100.0.0/16 | 100 | C1 |
| 10.10.200.0/24 | 200 | C1 |
| 10.10.10.1/24 | 200 | C1 |
| 10.10.300.0/24 | 300 | C1 |
| 10.10.10.1/24 | 300 | C1 |

L3 AGGREGATE ROUTER
78.50.58.1

MECHANISM FOR EXCHANGE OF ROUTING DATA BETWEEN CONTROLLERS

BACKGROUND OF THE INVENTION

The present invention relates generally to the field of software defined networking networks ("SDN networks"), and more particularly to inter-tenant and inter-openflow island communications in SDN networks. In conventional SDN networks, a centralized controller takes care of communication between the hosts in a given OF (openflow) island controlled by it. Conventionally, these communications can be: (i) either L2 protocol or L3 protocol; and (ii) intra tenant (between entities associated with a single tenant) or inter-tenant (between entities associated with more than one tenant).

OpenFlow (or "openflow") is a communications protocol that gives access to the forwarding plane of a network switch or router over the network. OpenFlow enables remote controllers to determine the path of network packets through the network of switches. Openflow separates the control from the forwarding to provide sophisticated traffic management. Openflow is often conventionally used in software defined networking (SDN). In conventional openflow systems, one openflow controller manages a set of openflow switches to form an "openflow island."

SUMMARY

According to an aspect of the present invention, there is a method, computer program product and/or system that performs the following steps (not necessarily in the following order): (i) providing a software defined networking (SDN) network including a plurality of openflow islands, a first tenant and a second tenant; and (ii) communicating, from the first tenant over the SDN network to the second tenant, a first communication. The first communication passes through at least two openflow islands of the plurality of openflow islands as the first communication is communicated through the SDN network from the first tenant to the second tenant.

BRIEF DESCRIPTION OF THE DRAWINGS

FIG. 5 is a table used with the second embodiment system;

FIG. 6 is a block diagram that illustrates some of the operations of the second embodiment system;

FIG. 7 is a table used with the second embodiment system;

FIG. 8 is a table used with the second embodiment system;

FIG. 9 shows a portion of the second embodiment system; and

FIG. 10 shows a portion of the second embodiment system.

DETAILED DESCRIPTION

Figure 1:
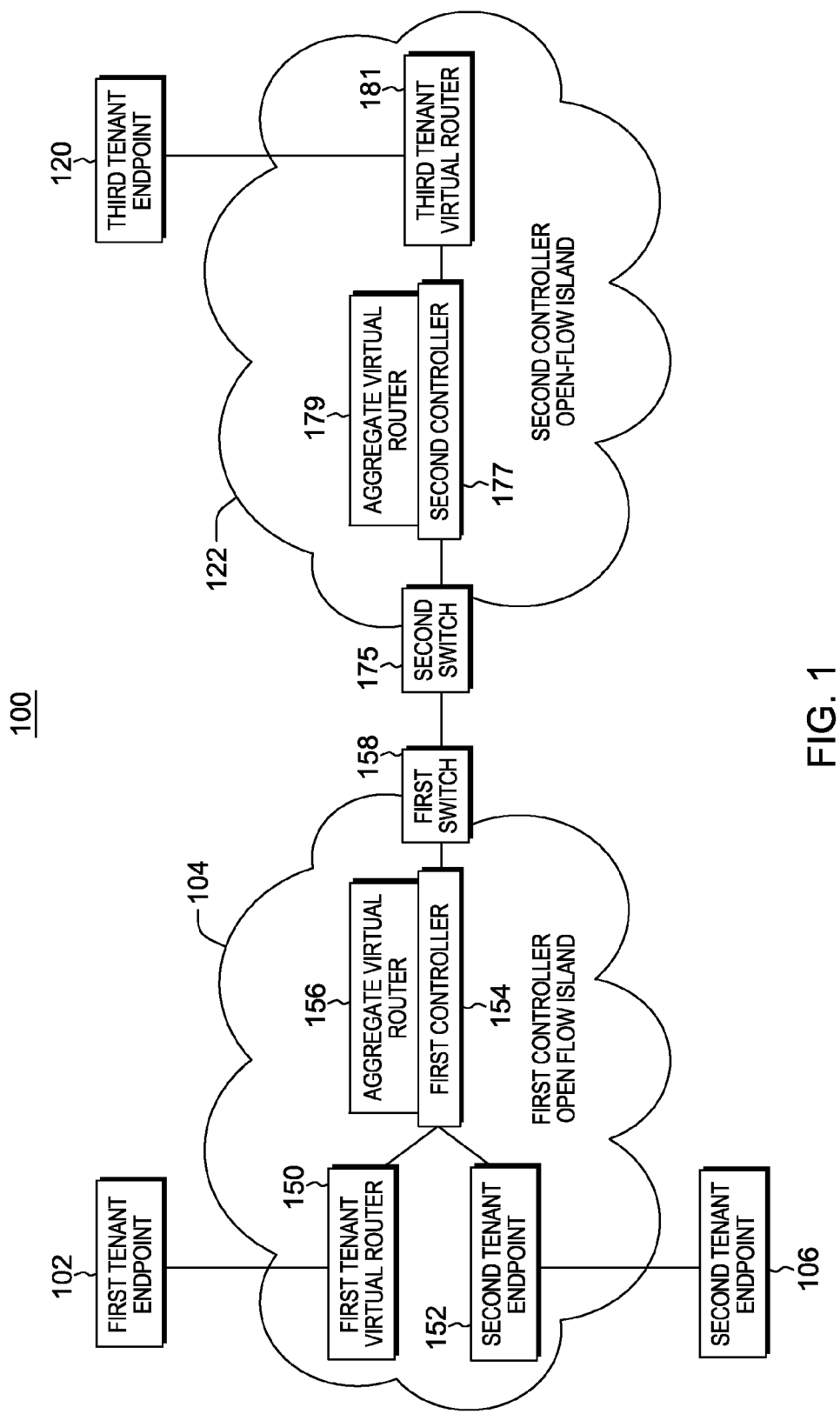
FIG. 1 is a block diagram view of a first embodiment of a system according to the present invention.

Some embodiments of the present invention send communications between two openflow islands. Some embodiments of the present invention encode tenant information into packet headers that can be used in conjunction with router look-up operations by openflow controllers. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
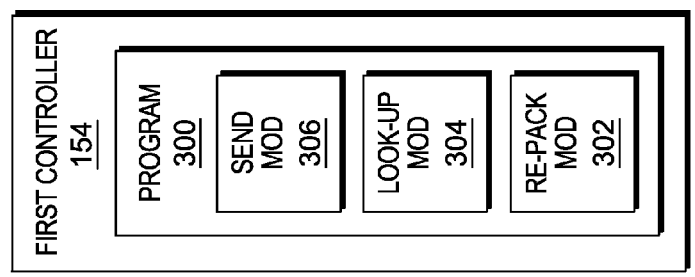
FIG. 3 is a block diagram view of a machine logic (for example, software) portion of the first embodiment system.

An embodiment of a possible hardware and software environment for software and/or methods according to the present invention will now be described in detail with reference to the Figures. FIG. 1 is a functional block diagram of networked computers system 100, including: first tenant endpoint 102; first controller openflow island 104; second tenant endpoint 106; third tenant endpoint 120; second controller openflow island 122; first tenant virtual router 150; second tenant virtual router 152; first controller 154 (which includes program 300 which is not separately shown in FIG. 1, but is shown in FIG. 3); aggregate virtual router 156; first switch 158; second switch 175; second controller 177; aggregate virtual router 179; and third tenant virtual router 181. As will be explained in more detail, below, in the Example Embodiment sub-section, first controller 154 packetizes data communications so that tenant information is included in the packet headers. This can facilitate communications from one openflow island to another.

Program 300 is stored in a persistent storage device (not separately shown in FIG. 1) for access and/or execution by one or more of the respective computer processors, usually through one or more memories of system 100. Persistent storage of this particular embodiment: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage of this embodiment. Program 300 may include both machine readable and performable instructions and/or substantive data (that is, the type of data stored in a database). In this particular embodiment, the persistent storage includes a magnetic hard disk drive. To name some possible variations, persistent storage may include a solid state hard drive, a semiconductor storage device, read-only memory (ROM), erasable programmable read-only memory (EPROM), flash memory, or any other computer-readable storage media that is capable of storing program instructions or digital information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. EXAMPLE EMBODIMENT

Figure 2:
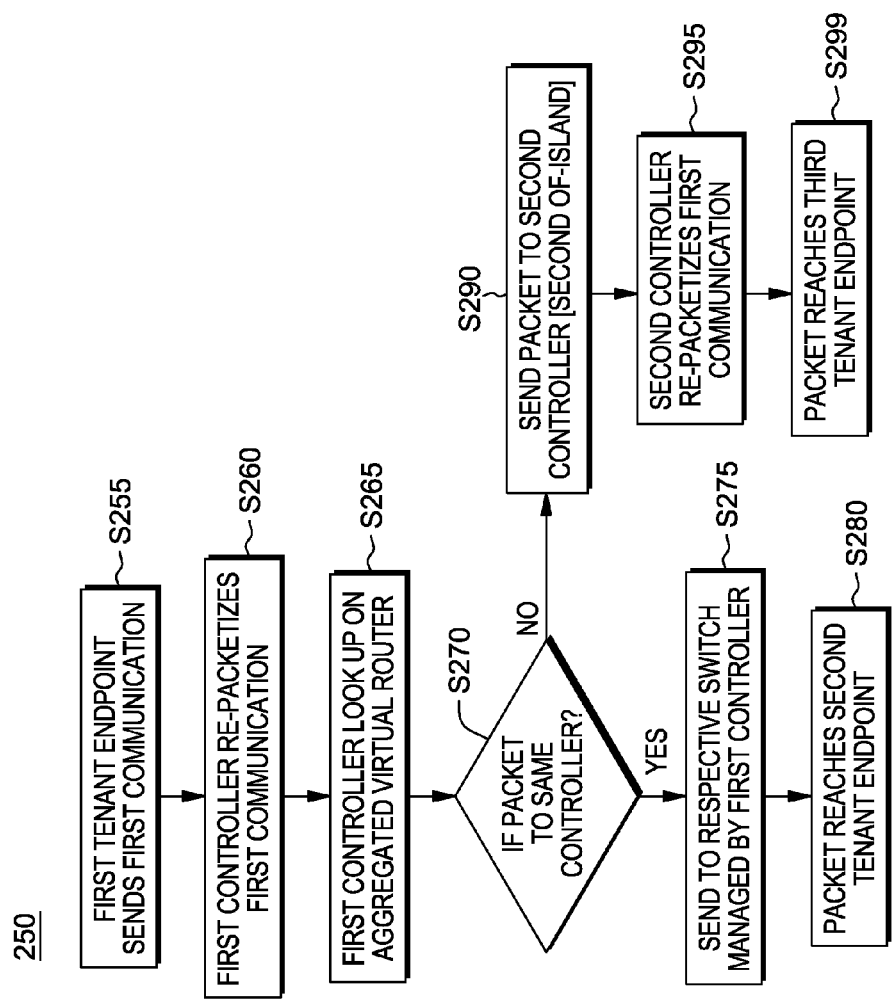
FIG. 2 is a flowchart showing a first embodiment method performed, at least in part, by the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

There are two controllers 154, 177 (see FIG. 1) involved in the various communications of flow chart 250. As shown in FIG. 1, first controller 154 has two tenants as follows: (i) first tenant 102, 150; and (ii) second tenant 106, 152. As shown in FIG. 2, flow chart 250 explains two types of communications: (i) inter-tenant communications (that is, within first controller openflow island 104 (see FIG. 2 at steps S275 and S280); and (ii) inter-of-island (across controller) communications (see FIG. 2 at steps S290 to S299). More specifically, process flow of flow chart 250 includes the following steps (with process flow among, and between, the steps as shown in FIG. 2): S255; S260; S265; S270; S275; S280; S290; S295; and S299.

As shown in steps S255, S260, S265, S270, S275, and S280, inter-tenant communication passing through a single controller 154, and single openflow island 104, will now be discussed. First Endpoint 102 sends data packet to First Tenant router 150. Controller 154 (more specifically, look-up module 304 of program 300 of first controller 154) identifies if the packet is for the same tenant by doing a lookup on "Aggregated Virtual Router" 156 and decides on how to route the packet. If the packet is directed for a tenant in the same openflow island 104, then re-pack module 302 of program 300 of first controller 154 encodes tenant information in the data packet and the packet is sent (by send module 306 of program 300 of first controller 154) to "Second Endpoint" 106 via valid path in openflow switch 152.

As shown in steps S255, S260, S265, S270, S290, S95, and S299, inter-tenant communication across multiple openflow islands, and across multiple controllers, will now be discussed. First Endpoint 102 sends a packet to First Tenant controller 154 through first tenant router 150. Look-up mod 304 of program 300 of first controller 154 performs lookup on Aggregated Virtual router 156. If the packet is destined for another controller in another openflow island (in this example, second controller 177 of openflow island 122), re-packetize module 302 of program 300 of first controller 154 encodes the tenancy information in MAC address field (see step S260) and sends packet to second controller openflow island 122 (more specifically second switch 175 and second controller 177). When the second controller receives the packet (see step S290), it repacketizes the packet (see step S295) and sends it along to third tenant endpoint 120 through third tenant virtual router 181.

III. FURTHER COMMENTS AND/OR EMBODIMENTS

Some embodiments of the present invention recognize the following facts, potential problems and/or potential areas for improvement with respect to the current state of the art: (i) in conventional SDN networks there is no way for different OF islands ("openflow islands") to communicate with each other; (ii) in conventional SDN networks, OF islands do not exchange their routing data to enable communication between the OF islands; (iii) in conventional SDN networks, there is no mechanism that communicates routing data so that it is shared across the autonomous SDN network system; and/or (iv) in conventional SDN networks, communication between different OF islands relies on an external router/network configuration that is not part of the SDN network system.

Some embodiments of the present invention may include one, or more, of the following features, characteristics and/or advantages: (i) a mechanism for exchange of routing data between controllers; (ii) controllers of different OF islands communicate directly with each other, and exchange their routing data, within the SDN network system; (iii) communication between different tenant networks residing in different OF islands is enabled through a simplified configuration; (iv) machine logic (that is, hardware and/or software) to enable the tenant specific virtual routers to talk to each other through an aggregated router; (v) the aggregated router instance of each controller will have information effectively disclosing the entire routing table from all the tenant specific virtual routers; (vi) the aggregated router instances from each controller are enabled to talk to each other and share their routing data; (vii) the routing tables are replicated across all the controllers; and/or (viii) the replication of the routing table data, across all the controllers, facilitates communication between OF islands.

Some embodiments of the present invention provide for inter-tenant communication within a single OF island of an SDN network in a way that includes one, or more, of the following features, characteristics and/or advantages: (i) the inter-tenant communication is completely configuration driven, (that is, only the configured tenants are allowed to communicate (or "talk") with each other; (ii) routing tables in the virtual router instances contain route entries pointing to network addresses on other tenants; (iii) the aforementioned route entries include tenant ids (identification codes) along with the network address and the next hop; (iv) the aforementioned rote entries are added based on the configuration that drives inter-tenant communication within the SDN network; (v) all the data packets going out of the subnet are stamped with the tenancy information (that is, the tenant id to be encoded in the packet); (vi) the stamping of the subnet with tenancy information is accomplished by making the virtual mac of the default gateway to contain the tenant id to be an encoded part of it; (vii) once the virtual router finds that the packet is destined to a network that is part of a different tenant then it is forwarded to the aggregated router; (viii) upon forwarding to the aggregated router, the virtual router populates the destination encoded part of the destination MAC (media access control) address in the packet; (ix) upon forwarding to the aggregated router, the aggregated router invokes the virtual router instance of the specific tenant; and/or (x) resulting flows are configured in the required switches to enable communication between the hosts.

Some embodiments of the present invention achieve inter-tenant communication without using any external router and by keeping the entire routing within the context of the SDN controller that is part of the SDN network itself.

An embodiment of routing exchange across OF islands and the related communication(s) will now be discussed. One embodiment of a method according to the present invention includes the following steps: (i) aggregated router instances from each controller talk to each other and share their routing tables with each other (this is somewhat similar to the BGP (Border Gateway Protocol) enabling edge routers from different autonomous systems to share their routing tables); (ii) once the routing table is shared, the aggregated router instances will have the routing tables from the local controller and controllers by pointing to a unique id of the controller; and (iii) once the routing table is replicated across controllers, routing for a tenant is configured to point to networks of both local and remote tenants (that is, the tenant network is available in a different OF island). When a data packet has to reach a tenant network available on a remote OF island, it flows through steps (i) to (iii) of the foregoing method and reaches the aggregated router. The aggregated router, by looking at the destination tenant id, determines that it needs to reach a remote OF island. The decision on whether it needs to be sent to a remote OF island can be made based on the controller id available in the routing entry. Packets that need to reach a remote OF island can be sent out in a pre-established tunnel to reach the other side. Packets received from the tunnel can be processed by first taking out the packet contained in it. The aggregated router at the remote OF island can then process it by looking at the destination tenant id part of the destination MAC address. The return traffic can also be processed in the same way.

The methods discussed in the previous paragraph ensure that the inter-tenant communication across different OF islands can be achieved without offloading the configuration to an external router. Any change in the connectivity and the routing data can be easily updated to all the controllers by means of frequent sync ups of the data. Routing data can be synchronized across different controllers of different OF islands by both incremental mode and the periodic sync up of the whole data.

Figure 4:
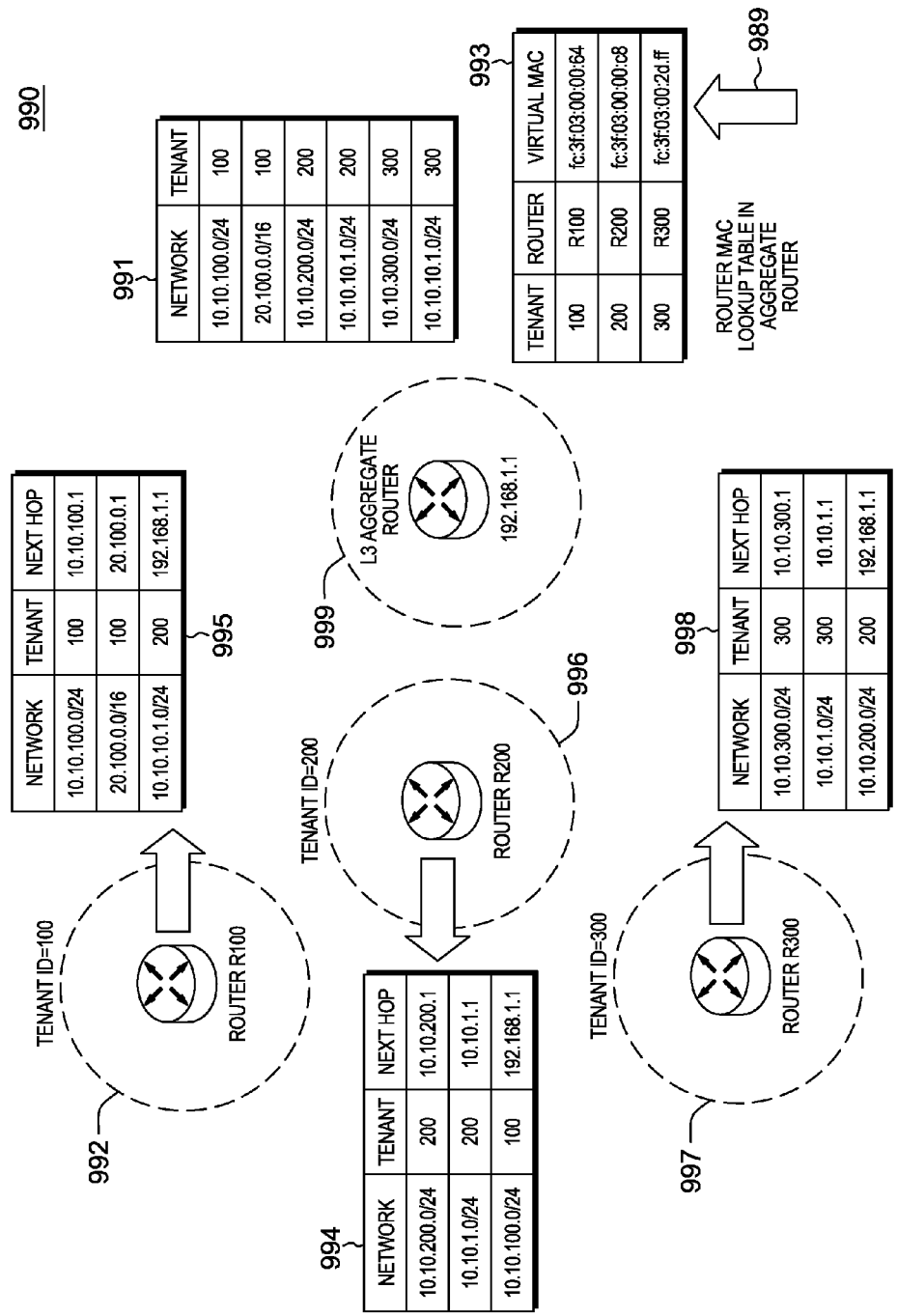
FIG. 4 is a block diagram view of a second embodiment of a system according to the present invention.

The discussion of the following paragraphs will involve diagram 990 of FIG. 4, table 980 of FIG. 5, diagram 960 of FIG. 6, table 950 of FIG. 7, table 940 of FIG. 8, diagram 930 of FIG. 9 and diagram 920 of FIG. 10. As shown in FIG. 4, diagram 990 includes: tables 991, 993, 995, 994, 998, routers 992, 996, 997, 999, and process path 989. As shown in FIG. 6, diagram 960 includes: tables 970, 972, 974, virtual MAC blocks 971, 973, 975, and result blocks 976, 977, 978. A sample scenario illustration will now be discussed. Assume a scenario with 3 tenants with ids 100, 200 and 300 respectively (see FIG. 4 at routers 992, 996, 997). Each of these tenant ids has a few subnets. Each tenant is configured to communicate with some of the subnets from the other tenants. As can be seen in diagram 990 of FIG. 4, the configuration in routing tables 994, 995, 998 involves network along with the tenant id to handle the ip address overlapping. For example, the network 10.10.1.0/24 is available in both tenant 200 and 300. Tenant 100 is configured to communicate with the network on 200. Hence, any traffic destined to 10.10.1.0/24 will be routed to the network in 200. This kind of configuration provides a way to configure routing in an unambiguous manner.

As shown in FIG. 4 at progress path 989, the least significant 24 bits of virtual MACs are used to encode the tenant id values (also sometimes herein referred to as, simply, "tenant ids")—that is: 0X64=100; 0Xc8=200 and 0X2dff=300. The same technique is used in the virtual mac that corresponds to the default gateway of each subnet of the tenant.

As shown in FIGS. 5 and 6, table 980 and diagram 960, taken together, illustrate a traffic traversal between tenant 100 and 200 and communication from Host A to Host B. The data packet traverses between the virtual routers of tenants and the aggregated router during the route setup. Once the flow rules are installed as seen below the traffic flows through without controller's intervention. All three of the stages shown in diagram 960 happen in the context of the same packet in by means of the L3 component taking packets to different virtual routers. At the end of the three stages, L3 installs a flow rule on an ingress switch with the match and action shown in table 950 of FIG. 7. After the packet in from the return path goes through the same processing mentioned above, the rule shown in table 940 of FIG. 8 will be installed on the ingress switch Host B.

As shown in FIGS. 9 and 10, diagrams 930 and 920, taken together, illustrate the routing data exchange between the controllers from different OF islands. The exchange is possible when they have ip connectivity between them. The tunnel between them can be established for the data packets to traverse through with the available ip (internet protocol) connectivity. Communication between the OF islands is controlled by controllers C1 ad C2 and is enabled with the routes being exchanged. The data packet going out of the OF island can be sent through the dedicated tunnel to reach the other OF island. There, the data packet tunneled with the tenancy information is processed and routed according to the destination.

The mechanism, discussed above, can bring in the following usages: (i) establishes connectivity between different OF islands and allows them to communicate to each other; (ii) ensures the configuration is not very complicated with respect to inter tenant/OF island communication; (iii) provides a way for each controller of OF island to notify other controllers with the update in the routing data; (iv) inter-tenant communication can be enabled without depending on the external hardware router (that is, keeping configuration and logic within the controller and not offloading to a hardware router); (v) complicated configuration of external network mapping and pointing to external network can be avoided when the communication is within the same L2 domain; (vi) when the complete control during inter-tenant communication lies within the controller it can apply additional QoS (quality of service) or SLA (service level agreement) related enforcements to resolve the routing; and (vii) tenancy information encoded part of this process can use tenancy identification for programming some of the other tenant specific flow rules as well.

Some embodiments of the present invention may make one or more of the following assumptions: (i) assumes that the tenant id can be unique across multiple OF islands or at least on the OF islands participating in the data exchange; and/or (ii) assumes that tunnels can be established between OF islands to send the data over (with the available data connectivity it should be possible to establish).

Some embodiments of the present invention may include one, or more, of the following features, characteristics and/or advantages: (i) enables controllers from different domains to exchange routing data; (ii) focus on the data exchange to simplify the data to be exchanged and the configuration required from the users; (iii) serve a geographically separated multi-tenant network distributed across multiple domains; (iv) potentially applicable to any overlay protocol used in an SDN network; (v) gives users a relatively high degree of control during the course of convergence; (vi) provides tenancy encoding in the data packets; (vii) provides a solution with virtual router instances running in controller domain; (viii) allows an exchange of routing information which are encoded with tenant semantics; (ix) provide a peer-to-peer mode of communication between different SDN controllers; and/or (x) provides for routing exchange between like routers from different autonomous systems exchange routing through BGP.

Some embodiments of the present invention may include one, or more, of the following features, characteristics and/or advantages: (i) enabling inter-tenant and inter-openflow island communication in an SDN (Software Defined Networking) network by consolidation of routing data; (ii) encoding tenancy information on the data packets in SDN network by encoding tenant data as part of a layer 2 header; (iii) data exchange between multiple controllers in an SDN network by exchanging routing data and handle routing; and/or (iv) inter-tenant routing management using routing table aggregation across controllers in an SDN network by management and exchange of aggregated routing entries.

Encoding tenancy information on the data packets in an SDN network, according to an embodiment of the present invention, will now be discussed. Tenancy information is encoded as part of Ethernet Header (Layer2) MAC address field. When data is sent from a tenant to another tenant (in same controller domain or other controller domain), the packet is sent with Source MAC as Aggregated Virtual Router's MAC address. This Aggregated Virtual Router instance running in controller will encode the tenancy information into its Ethernet header field and send further along its communication path. MAC address field in the Ethernet header will contain 6-octet (6-bytes) to represent the MAC address. The last 3-octets can be used to encode the tenancy information in the MAC address. If the last three octets are used, the controller will be able to model $2^{24}=16777216$ unique tenants. If the controller uses the last one octet to represent the tenancy information, $2^{8}=256$ unique tenants can be represented. A controller can choose to model tenancy information using any number of bits/bytes in the last 3-octet of Virtual MAC address.

An endpoint of a tenant will send the packet, which will be processed by the controller and perform tenancy encoding based on the packet's destination IP address and Virtual Router's routing table. Encoding the tenancy information will be performed in the controller when a packet is sent to the controller. A controller can also perform tenancy encoding by installing a flow on open-flow switch to which the endpoint is connected and can use OpenFlow Action "set DL_SRC" to perform this.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A method comprising:
providing a software defined networking (SDN) network including a plurality of Openflow islands, a first tenant and a second tenant; and
communicating, from the first tenant over the SDN network to the second tenant, a first communication, comprising:
sending the first communication to a first Openflow island of the plurality of Openflow islands, wherein the first communication comprises an identification of the second tenant;
determining the destination address of the second tenant based on a lookup on a aggregated virtual router;
wherein:
the first communication passes through at least two Openflow islands of the plurality of Openflow islands as the first communication is communicated through the SDN network from the first tenant to the second tenant.

2. The method of claim 1 further comprising:
encoding tenant information into a first data packet; and
incorporating the first data packet into the first communication.

3. The method of claim 2 wherein:
the encoding of tenant information encodes the tenant information at least partially into a header of the first data packet.

4. The method of claim 3 wherein:
the encoding of tenant information encodes the tenant information at least partially into a Ethernet header MAC address field of the header of the first data packet.

5. The method of claim 1 further comprising:
exchanging data between multiple controllers in the SDN network.

6. The method of claim 1 further comprising:
managing inter-tenant routing using routing table aggregation across controllers in the SDN network.

7. A computer program product comprising a computer readable storage medium, wherein the computer readable storage medium is non-transitory, per se, having stored thereon:
first program instructions programmed to provide a software defined networking (SDN) network including a plurality of Openflow islands, a first tenant and a second tenant; and
second program instructions programmed to communicate, from the first tenant over the SDN network to the second tenant, a first communication, comprising:
third program instructions programmed to send the first communication to a first Openflow island of the plurality of Openflow islands, wherein the first communication comprises an identification of the second tenant;
fourth program instructions programmed to determine the destination address of the second tenant based on a lookup on a aggregated virtual router;
wherein:
the first communication passes through at least two Openflow islands of the plurality of Openflow islands as the first communication is communicated through the SDN network from the first tenant to the second tenant.

8. The product of claim 7 wherein the medium as further stored thereon:
fifth program instructions programmed to encode tenant information into a first data packet; and
sixth program instructions programmed to incorporate the first data packet into the first communication.

9. The product of claim 8 wherein third program instructions are further programmed to:
   encode the tenant information at least partially into a header of the first data packet.

10. The product of claim 9 wherein third program instructions are further programmed to:
    encode the tenant information at least partially into a Ethernet header MAC address field of the header of the first data packet.

11. The product of claim 7 wherein the medium has further stored thereon:
    third program instructions programmed to exchange data between multiple controllers in the SDN network.

12. The product of claim 7 wherein the medium has further stored thereon:
    third program instructions programmed to manage inter-tenant routing using routing table aggregation across controllers in the SDN network.

13. A computer system comprising:
    a processor(s) set; and
    a computer readable storage medium;
    wherein:
    the processor set is structured, located, connected and/or programmed to run program instructions stored on the computer readable storage medium; and
    the program instructions include:
       first program instructions programmed to provide a software defined networking (SDN) network including a plurality of Openflow islands, a first tenant and a second tenant, and
       second program instructions programmed to communicate, from the first tenant over the SDN network to the second tenant, a first communication, comprising:
          third program instructions programmed to send the first communication to a first Openflow island of the plurality of Openflow islands, wherein the first communication comprises an identification of the second tenant;
          fourth program instructions programmed to determine the destination address of the second tenant based on a lookup on a aggregated virtual router;
       wherein:
       the first communication passes through at least two Openflow islands of the plurality of Openflow islands as the first communication is communicated through the SDN network from the first tenant to the second tenant.

14. The system of claim 13 wherein the medium as further stored thereon:
    fifth program instructions programmed to encode tenant information into a first data packet; and
    sixth program instructions programmed to incorporate the first data packet into the first communication.

15. The system of claim 14 wherein third program instructions are further programmed to:
    encode the tenant information at least partially into a header of the first data packet.

16. The system of claim 15 wherein third program instructions are further programmed to:
    encode the tenant information at least partially into a Ethernet header MAC address field of the header of the first data packet.

17. The system of claim 13 wherein the medium has further stored thereon:
    third program instructions programmed to exchange data between multiple controllers in the SDN network.

18. The system of claim 13 wherein the medium has further stored thereon:
    third program instructions programmed to manage inter-tenant routing using routing table aggregation across controllers in the SDN network.

* * * * *